United States Patent
Sakai et al.

(10) Patent No.: US 7,804,188 B2
(45) Date of Patent: Sep. 28, 2010

(54) TERMINATION CIRCUIT, VEHICLE-MOUNTED CONTROL APPARATUS, AND VEHICLE-MOUNTED COMMUNICATION SYSTEM

(75) Inventors: Naoto Sakai, Takahama (JP); Kouji Kondoh, Tokoname (JP)

(73) Assignee: Denso Corporation, Kariya (JP)

( * ) Notice: Subject to any disclaimer, the term of this patent is extended or adjusted under 35 U.S.C. 154(b) by 236 days.

(21) Appl. No.: 12/038,833

(22) Filed: Feb. 28, 2008

(65) Prior Publication Data
US 2008/0204172 A1 Aug. 28, 2008

(30) Foreign Application Priority Data
Feb. 28, 2007 (JP) ............... 2007-049556

(51) Int. Cl.
*B60L 1/00* (2006.01)
*H01P 1/26* (2006.01)
*G05B 11/01* (2006.01)

(52) U.S. Cl. ............... 307/10.1; 333/22 R; 340/310.13
(58) Field of Classification Search ............... 307/10.1, 307/20; 333/22 R
See application file for complete search history.

(56) References Cited

U.S. PATENT DOCUMENTS

| 5,130,677 A * | 7/1992 | Takai ............... 333/22 R |
| 2005/0219006 A1 | 10/2005 | Suenaga et al. |
| 2007/0252659 A1 | 11/2007 | Suenaga et al. |

FOREIGN PATENT DOCUMENTS

| JP | 8-115820 | 5/1996 |
| JP | 2005-318539 | 11/2005 |
| JP | 2006-345258 | 12/2006 |
| WO | 2006/040869 | 4/2006 |

OTHER PUBLICATIONS

Japanese Office Action dated Oct. 28, 2008 issued in corresponding Japanese Application No. 2007-049556 with English Translation.
Montrose, Mark;"EMC Design of Printed Wiring Board"; Misue Co., Ltd.; Jan. 20, 2006; pp. 240 (discussed on p. 2 of the spec.).
"Transistor Technology" CQ Publishing; Jul. 1997; pp. 286 (discussed on p. 2 of the spec.).
"CANphy specification" Cia (CanInAutomotive) http://www.cancia.org/; 45 pages; no date.

* cited by examiner

*Primary Examiner*—Michael Rutland Wallis
(74) *Attorney, Agent, or Firm*—Nixon & Vanderhye, PC

(57) ABSTRACT

The termination circuit for use in a transmission line to transmit a differential signal includes a first series circuit of a resistive element and an inductive element connected between one of two signal wires of the transmission line and a reference potential, and a second series circuit of a resistive element and an inductive element connected between the other of the signal wires and the reference potential. The inductive elements of the first and second series circuits are magnetically coupled such that they generate magnetic fields having such directions as to reinforce each other when a common-mode signal flows along the transmission line, and generate magnetic fields having such directions as to weaken each other when a differential-mode signal flows along the transmission line.

17 Claims, 18 Drawing Sheets

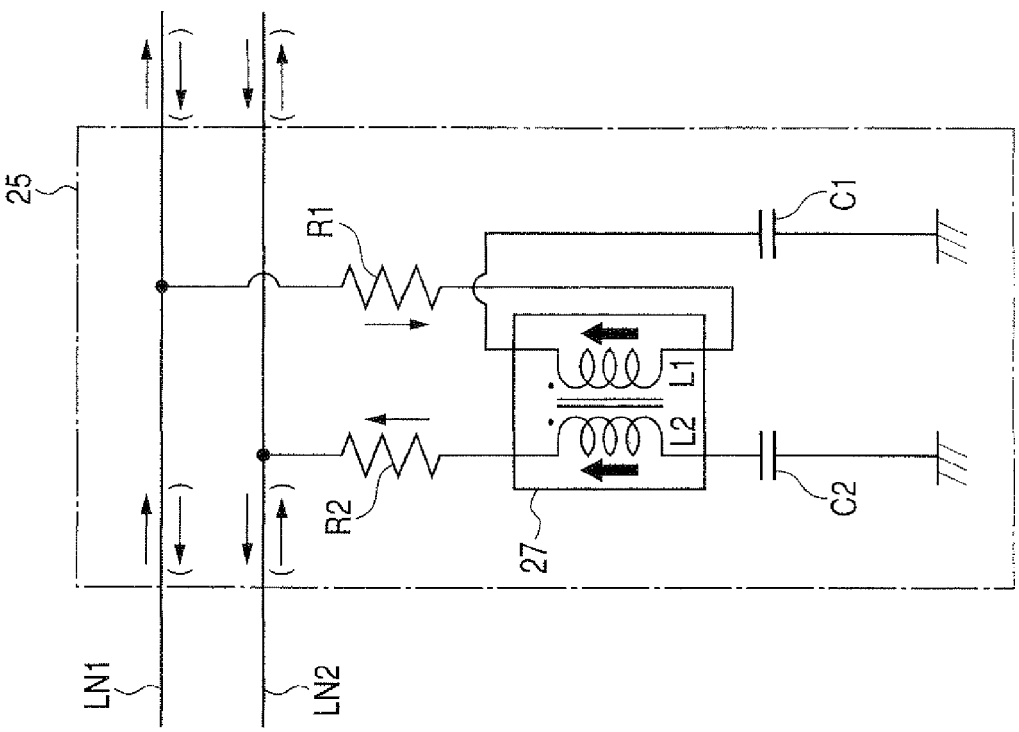
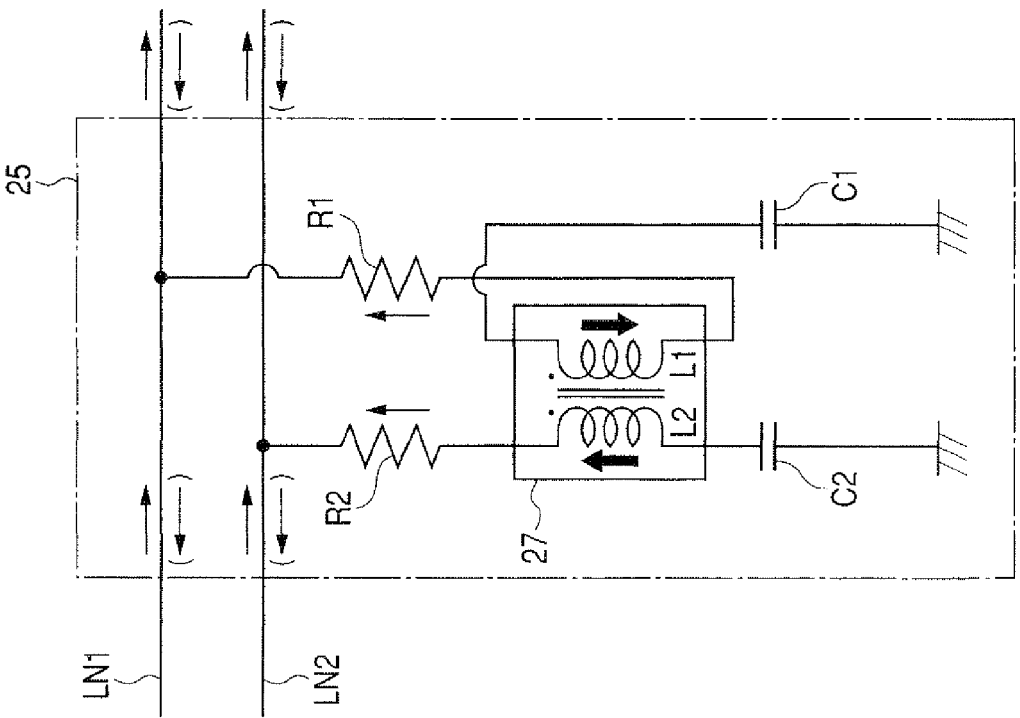

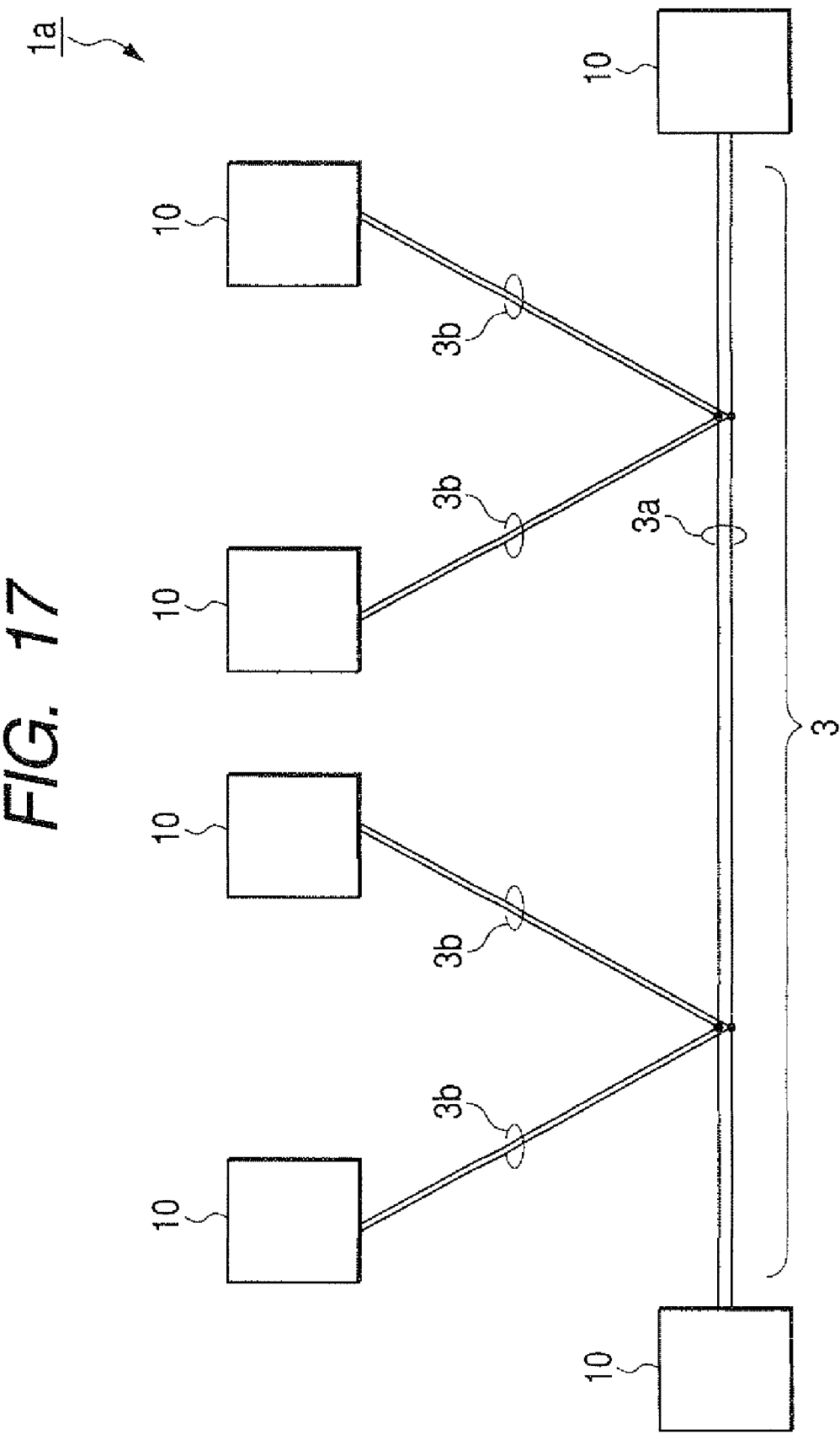

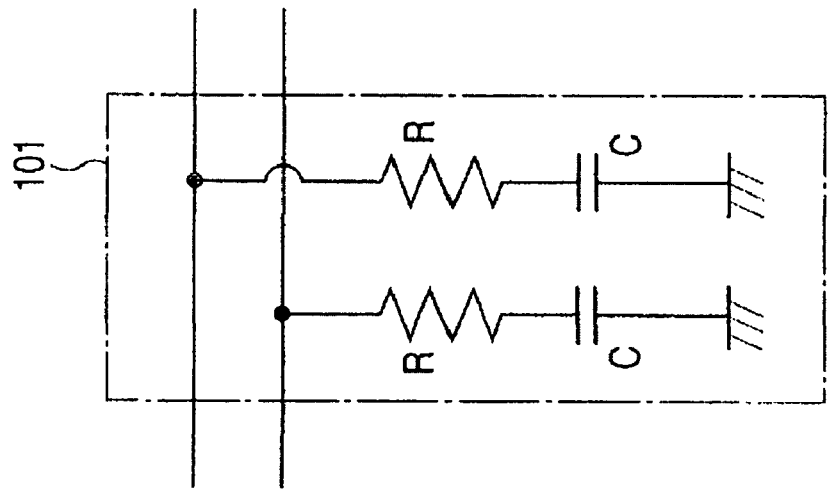
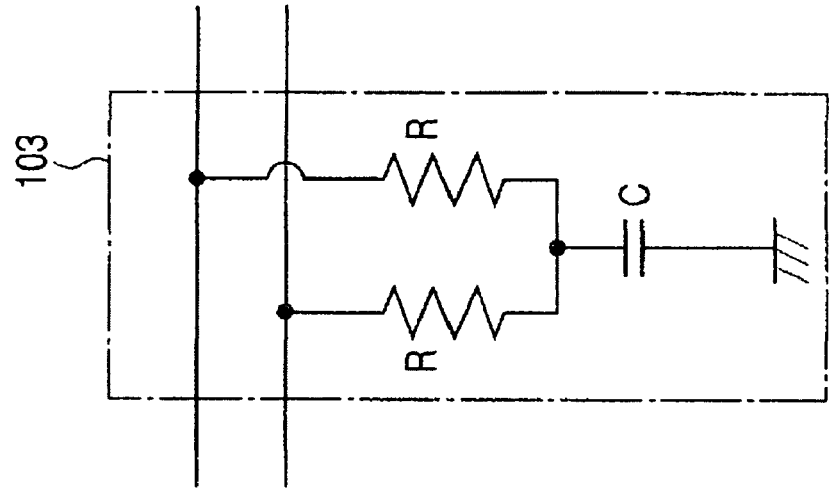

TERMINATION CIRCUIT, VEHICLE-MOUNTED CONTROL APPARATUS, AND VEHICLE-MOUNTED COMMUNICATION SYSTEM

CROSS-REFERENCE TO RELATED APPLICATION

This application is related to Japanese Patent Application No. 2007-49556 filed on Feb. 28, 2007, the contents of which are hereby incorporated by reference.

BACKGROUND OF THE INVENTION

1. Field of the Invention

The present invention relates to a termination circuit used in a transmission line constituted by a pair of signal wires for transmitting a differential signal, a vehicle-mounted control apparatus, and a vehicle-mounted communication system including the termination circuit and the vehicle-mounted control apparatus.

2. Description of Related Art

Generally, as shown in FIG. 18A, in a communication system in which a plurality of terminal apparatuses 110 are connected to a transmission line LN having a bus-like configuration or a star-like configuration, a termination circuit 100 is connected to each of the open ends of the transmission line LN to prevent signal reflection at the open ends.

It has been known to use a termination circuit which has a function of reducing emission noise, that is, noise emitted from the terminal apparatuses 110 through the transmission line LN, and reducing immunity noise, that is, noise entering the terminal apparatuses 110 through the transmission line LN.

Usually, for a single-wire transmission line, a RC termination circuit is used as disclosed, for example, in "EMC Design of Printed Wiring Board" by Mark I. Montrose, pp. 240, published Jan. 20, 2006 by Misue Co., Ltd. And, for a double-wire transmission line for transmitting a differential signal, a split termination circuit is used, which is a modified version of the RC termination circuit, as disclosed, for example, in "Transistor Technology" 1997 July issue pp. 286, published by CQ Publishing.

As shown in FIG. 19A, the RC termination circuit 101 is constituted by a resistive element R (resistor) and a capacitive element C (capacitor) connected in series between a signal wire constituting a single-wire transmission line (or one of two signal wires constituting a double-wire transmission line) and the ground. And as shown in FIG. 19B, the split termination circuit 103 is constituted by a pair of resistive elements R respectively connected to two signal wires constituting a double-wire transmission line, a capacitive element C connected between a connection node (neutral point) of these resistive elements R and the ground.

In the following explanation, the RC termination circuit 101 and the split termination circuit 103 are referred to as a conventional circuit. By using the conventional circuit 101 or 103 in a transmission line, particularly, in a double-wire transmission line, it is possible to remove common mode noise, and accordingly to improve resistivity to immunity noise, because the capacitive element C included in the conventional circuit 101 or 103 lets an AC component on the transmission line into the ground. In addition, if the waveform of a differential signal flowing on the transmission line is asymmetrical, since it is shaped to have a symmetrical shape by charge/discharge operation of the capacitor element C, emission noise can be reduced as well.

However, since the termination circuit 100 (101, 103) is located at the open end of the transmission line, the above described anti-noise effect thereof varies depending on a distance to the open end of the transmission line. Although the terminal apparatus 110 located close to the open end can fully obtain the anti-noise effect, the terminal apparatus 110 located remote from the open end cannot fully receive the anti-noise effect.

To cope with this problem, it is known to adopt the "multi-termination concept" in which all the terminal apparatuses 110 are provided with the termination circuit 100 as shown in FIG. 18B. For example, refer to Cia (CanInAutomotive) http://www.can-cia.org/ "CANphy specification" pp. 34-35.

Incidentally, to increase the anti-noise effect, it is desirable that the resistance of the resistor element R of the conventional circuit 101 or 103 is set to a small value, so that a high frequency component (noise component) can be easily bypassed to the ground through the capacitive element C.

On the other hand, to increase the signal transmission speed of the transmission line, it is desirable that the resistance of the resistor element R of the conventional circuit 101 or 103 is set to a large value to prevent the rising and falling edges of a differential signal flowing on the transmission line from attenuating or dulling, so that a high frequency component (differential mode component) of the differential signal cannot be easily bypassed to the ground through the capacitive element C.

In addition, the resistive element R of the conventional circuit 101 or 103 constitutes, together with an output impedance of a signal transmit/receive circuit (transceiver), a voltage dividing circuit that divides down an output voltage of the transceiver. Accordingly, the amplitude of a differential signal delivered to the transmission line reduces with the reduction of the resistance of the resistive element R.

The reduction of the amplitude of a differential signal not only lowers the accuracy of digitizing the differential signal at a receiving side, but also imposes a large restriction on the length and layout of the transmission line.

It should be noted that changing the resistance of the resistive element of the termination circuit impairs the original function of the termination circuit (to suppress signal reflection by its resistive element set equal to the characteristic impedance of a twist pair wire as a transmission line), and accordingly, the resistance of the resistive element of the termination circuit cannot be changed arbitrary.

In the case of adopting the multi-termination concept, since the resistive elements included in the terminal apparatuses 110 are connected in parallel with one another, the combined resistance of these resistive elements increases with the increase of the number of the terminal apparatuses 110, the problem of the reduction of the amplitude of a differential signal arises as in the case of reducing the resistance of the resistive element.

To ensure a necessary value of the amplitude of a differential signal in the case of adopting the multi-termination concept, the resistance of the resistive element has to be increased depending on the number of the terminal apparatuses 110 connected to the transmission line. However, this lowers the anti-noise effect described above.

As explained above, ensurement of a necessary value of the amplitude of a differential signal, and improvement of a signal transmission speed of a transmission line are in a trade-off relationship, and hence it is difficult to satisfy both of them.

SUMMARY OF THE INVENTION

The present invention provides a termination circuit for use in a transmission line constituted by a first signal wire and a second signal wire to transmit a differential signal comprising:

a first series circuit of a first resistive element and a first inductive element, one end of the first resistive element being connected to the first signal wire, the other end of the first resistive element being connected to one end of the first inductive element, the other end of the first inductive element being applied with a reference voltage;

a second series circuit of a second resistive element and a second inductive element, one end of the second resistive element being connected to the second signal wire, the other end of the second resistive element being connected to one end of the second inductive element, the other end of the second inductive element being applied with the reference voltage;

the first and second inductive elements being magnetically coupled such that the first and second inductive elements generate magnetic fields having such directions as to reinforce each other when a common-mode signal flows along the transmission line, and generate magnetic fields having such directions as to weaken each other when a differential-mode signal flows along the transmission line.

The present invention also provides a termination circuit for use in a transmission line constituted by a first signal wire and a second signal wire to transmit a differential signal comprising:

a first series circuit of a first resistive element and a first inductive element, one end of the first resistive element being connected to the first signal wire, the other end of the first resistive element being connected to one end of the first inductive element, the other end of the first inductive element being applied with a reference voltage;

a second series circuit of a second resistive element and a second inductive element, one end of the second resistive element being connected to the second signal wire, the other end of the second resistive element being connected to one end of the second inductive element, the other end of the second inductive element being applied with the reference voltage; and a reference potential generating circuit generating, as the reference potential, a potential equivalent to a center potential of the differential signal.

The present invention also provides a vehicle-mounted control apparatus and a vehicle-mounted communication system each of which includes the termination circuit described above.

According to the present invention, it is possible to provide a termination circuit that can improve a signal transmission speed of a differential signal, and to ensure a good waveform of the differential signal without sacrificing its anti-noise effect, and to provide a vehicle-mounted control apparatus and a vehicle-mounted communication system each including such a termination circuit.

Other advantages and features of the invention will become apparent from the following description including the drawings and claims.

BRIEF DESCRIPTION OF THE DRAWINGS

In the accompanying drawings:

FIGS. 6A and 6B are diagrams explaining operation of the termination circuit;

FIG. 17 is a diagram schematically showing an overall structure of a variant of the vehicle-mounted communication system according to the embodiment of the invention;

FIGS. 19A and 19B are diagrams showing structures of conventional termination circuits;

PREFERRED EMBODIMENTS OF THE INVENTION

Figure 1:
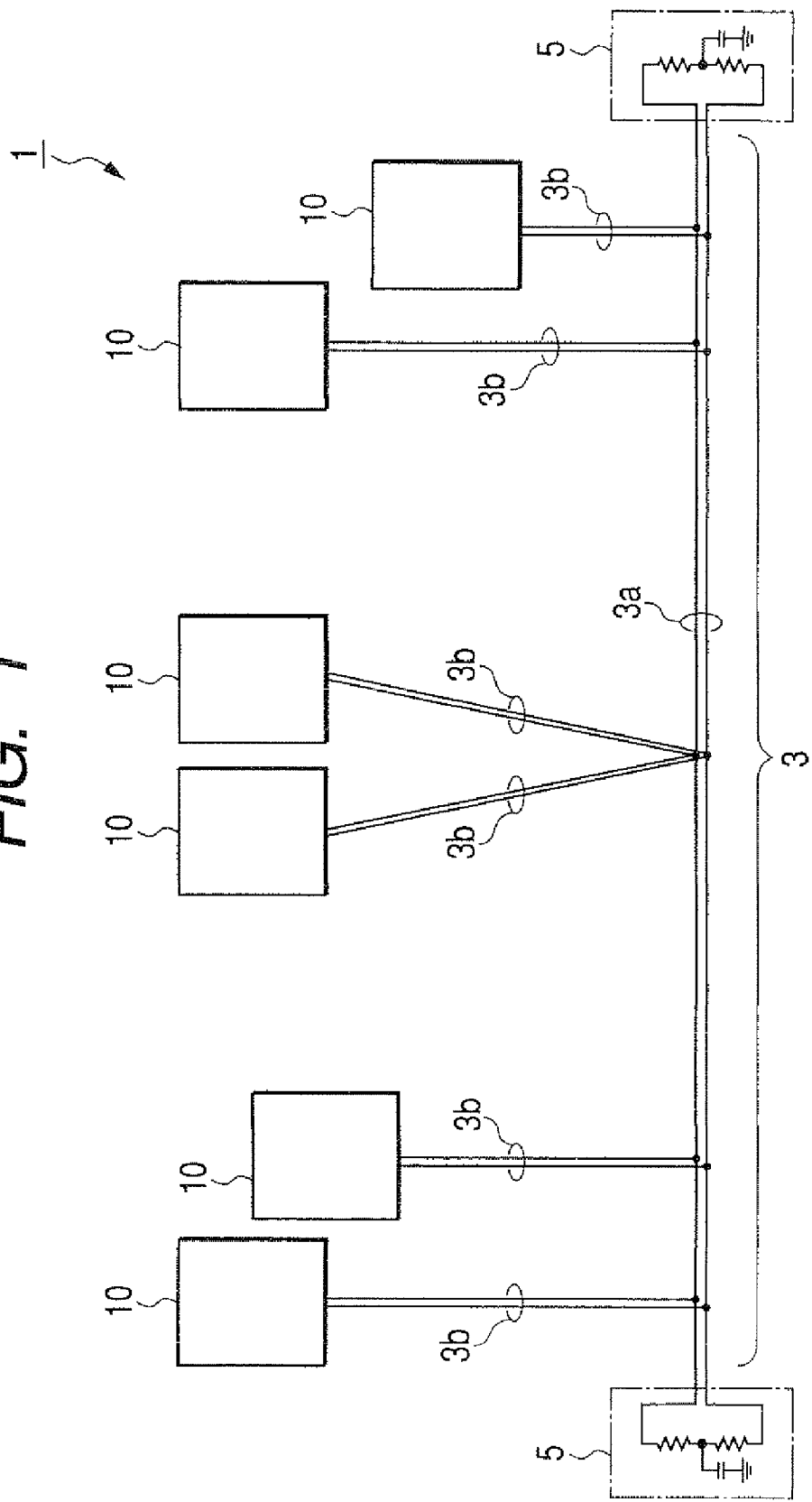
FIG. 1 is a diagram schematically showing an overall structure of a vehicle-mounted communication system according to an embodiment of the invention.

FIG. 1 is a diagram schematically showing an overall structure of a vehicle-mounted communication system 1 according to an embodiment of the invention. The vehicle-mounted communication system 1 includes a transmission line 3 constituting a LAN, and a plurality of vehicle-mounted control apparatuses 10 connected to the transmission line 3.

The transmission line 3, which has a bus-like configuration, includes a trunk line 3a and branch lines 3b branching from the trunk line 3a. Each vehicle-mounted control apparatuses 10 is connected to an end of a corresponding one of the branch lines 3b. The transmission line 3 is constituted by a twist-pair line formed by a pair of signal wires twisted together.

The transmission line 3 is connected with a termination circuit 5 at each of the open ends thereof. The termination circuit 5 is a split termination circuit constituted by a pair of resistive elements having the same resistance and connected in series between the pair of the signal wires of the transmission line, and a capacitor connected to a connection node (neutral point) of the resistive elements at one end thereof and grounded at the other end thereof.

Figure 2:
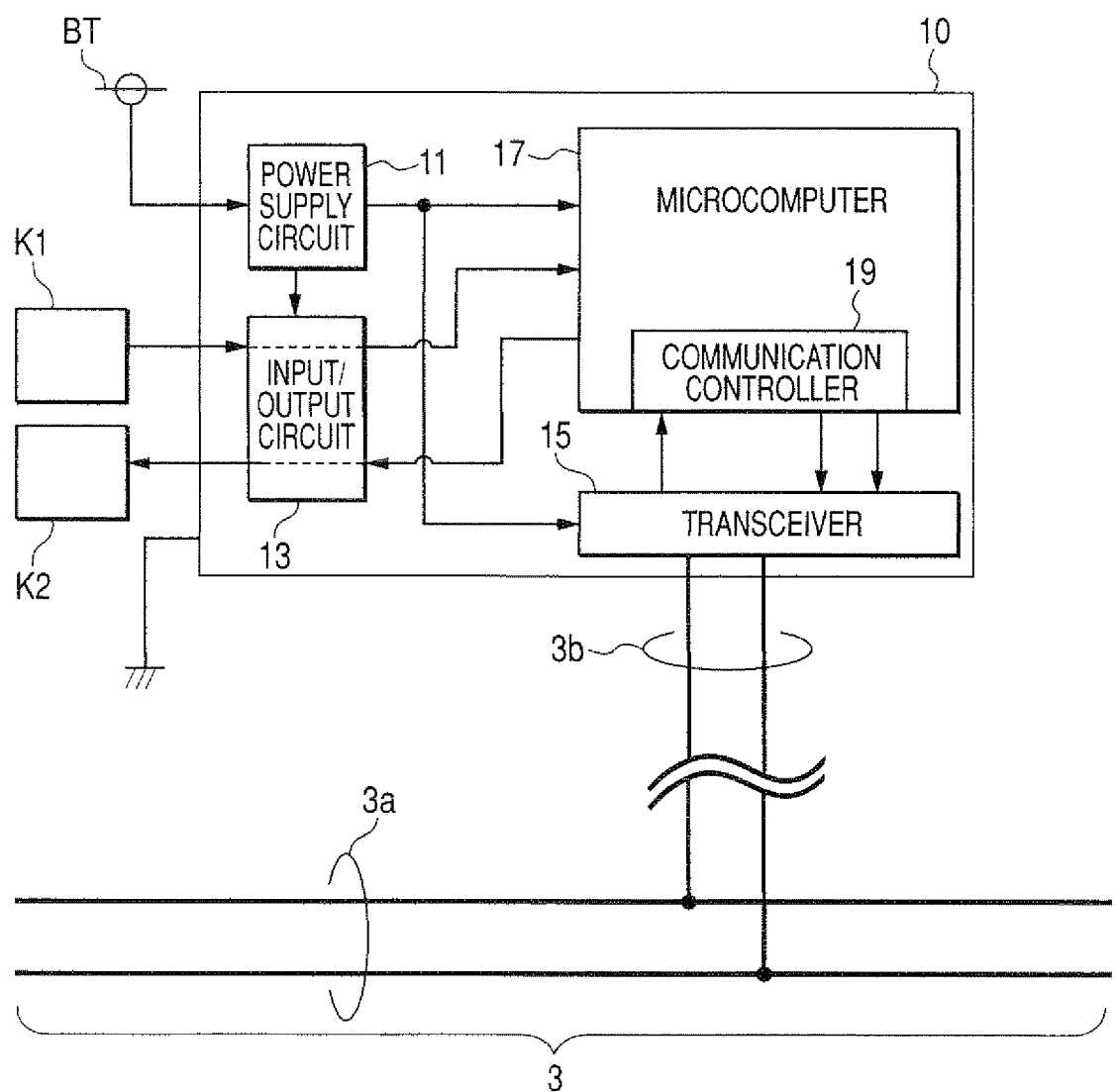
FIG. 2 is a block diagram showing a structure of a vehicle-mounted control apparatus included in the vehicle-mounted communication system.

FIG. 2 is a block diagram showing the structure of the vehicle-mounted control apparatus 10. As shown in this figure, the vehicle-mounted control apparatus 10 includes a power supply circuit 11 receiving electric power from an external power source (battery) BT and generating a power supply voltage to be supplied to each component of the vehicle-mounted control apparatus 10 by performing voltage conversion, an input/output circuit 13 for exchanging various signals with external devices K1, K2, a transceiver (transmit/receive circuit) 15 for transmitting and receiving differential signals through the transmission line 3, and a microcomputer 17. The microcomputer 17, which is constituted by a CPU, a ROM, a RAM, and a communication controller 19, receives detection signals and state signals from various sensors and switches including the external device K1, outputs drive signals to various drive circuits and load circuits including the external device K2 through the input/output circuit 13, and communicates with another vehicle-mounted control apparatus 10 connected to the transmission line 3 through the transceiver 15 for performing various vehicle controls.

Figure 3:
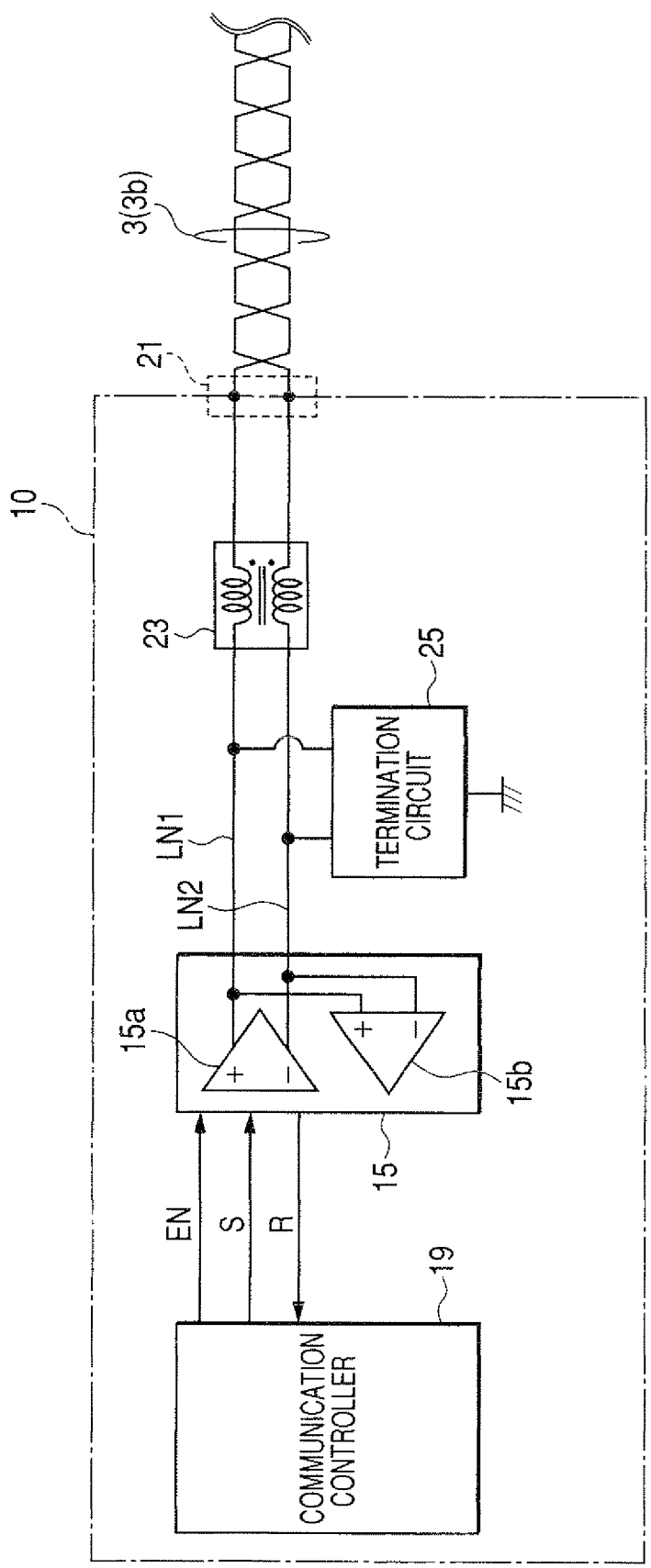
FIG. 3 is a connection diagram of the vehicle-mounted control apparatus around a transceiver and a termination circuit included therein.

FIG. 3 is a connection diagram of the vehicle-mounted control apparatus 10 around its transceiver 15 and a termination circuit 25 included in the vehicle-mounted control apparatus 10.

As shown in FIG. 3, in the vehicle-mounted control apparatus 10, an input/output terminal 21 to which the branch line 3b is connected, and the transceiver 15 are connected to each other through a pair of signal lines LN1, LN2. The pair of the signal lines LN1, LN2 is provided with a noise-suppressing component 23 constituted by a common mode choke coil. The termination circuit 25 is connected between the transceiver 15 and the noise-suppressing component 23.

The transceiver 15 is constituted of a transmit circuit 15a, and a receive circuit 15b. The transmit circuit 15a converts digitized transmit data S supplied from the communication controller 19 into a differential signal upon receiving a transmission permission signal from the communication controller 19, and delivers it to the signal lines LN1, LN2 and consequently to the transmission line 3. The receive circuit 15b converts a differential signal received through the transmission line 3 and consequently through the signal lines LN1, LN2 into digitized receive data R by performing value comparison on this differential signal, and supplies it to the communication controller 19.

Figure 4:
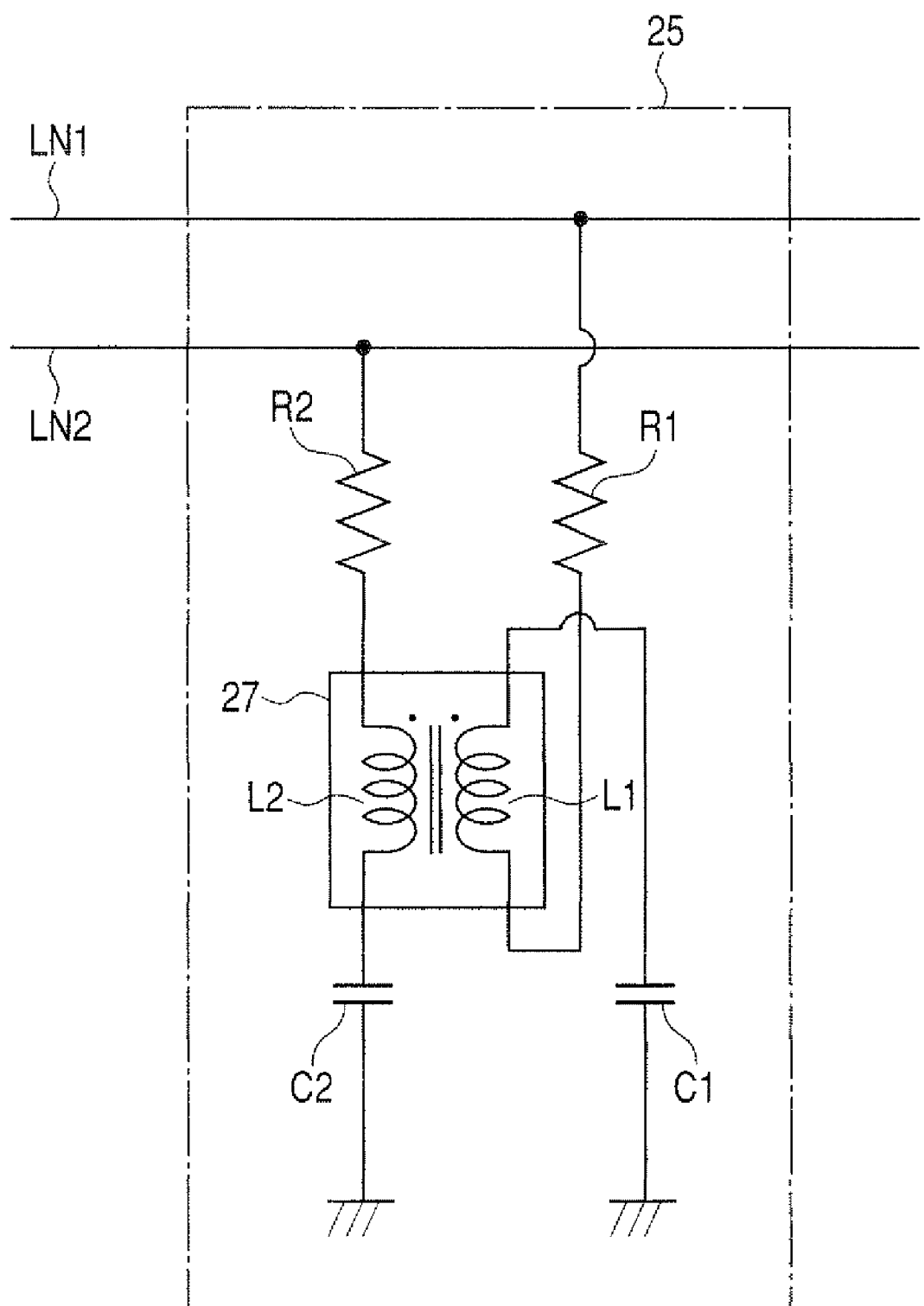
FIG. 4 is a circuit diagram of a termination circuit included in the vehicle-mounted control apparatus.
Figure 5:
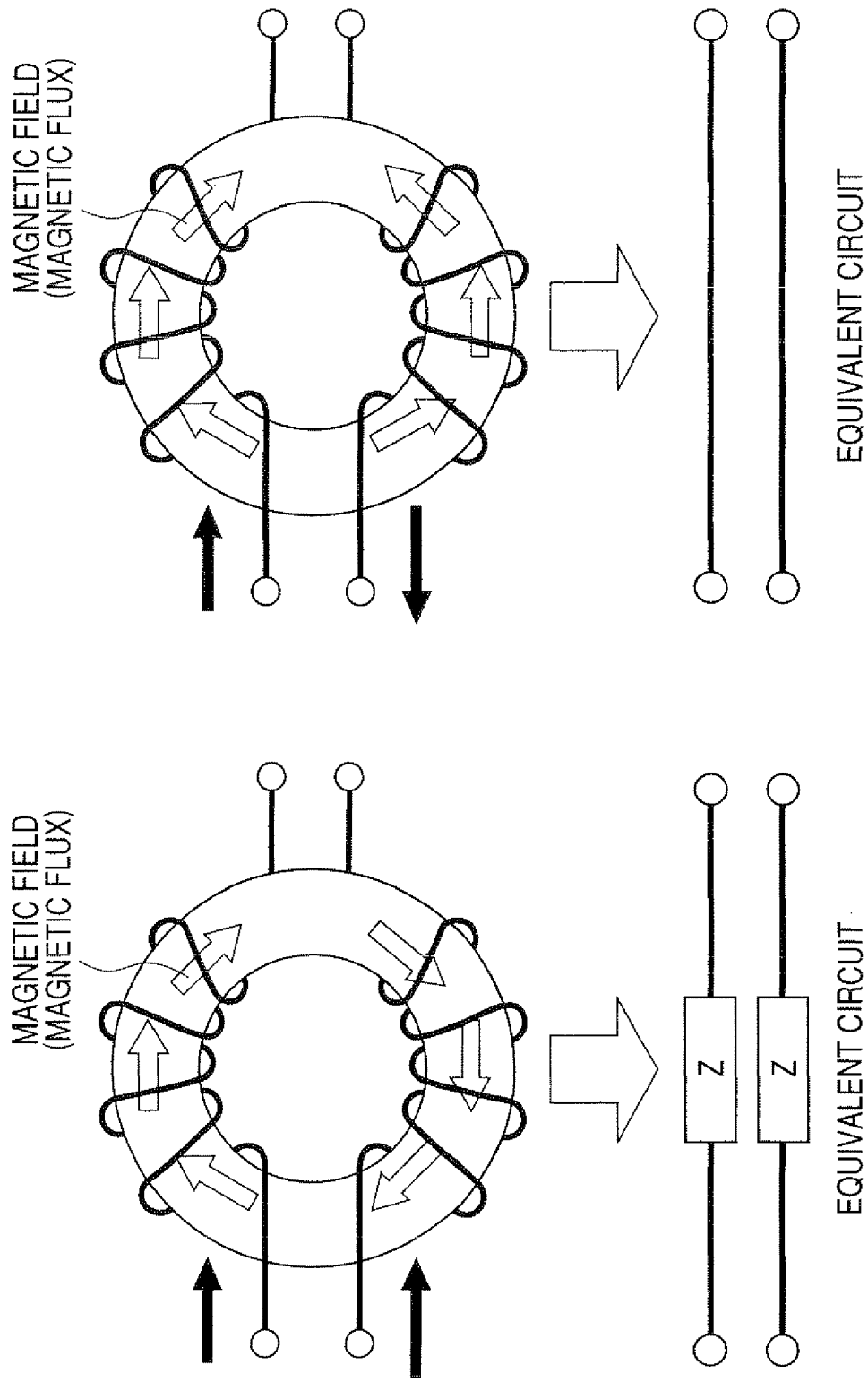
FIG. 5 is a diagram showing a structure and an operation of a common mode choke coil included in the termination circuit.

FIG. 4 is a circuit diagram of the termination circuit 25. The termination circuit 25 includes a common mode choke coil 27 (see FIG. 5) constituted by a closed magnetic core, and a pair of inductive elements (coils) L1, L2 wound around this core.

Each coil Li (i being 1 or 2) is connected to the signal line LNi at its one end through a resistive element Ri, and grounded at the other end thereof through a capacitive element (capacitor) Ci.

The termination circuit 25 is so configured that, when a current flows from the ground to each of the signal lines LN1, LN2 or vice versa (this current being referred to as "common current" hereinafter) as shown in FIG. 6A, the coils L1, L2 generate magnetic fields having such directions that these magnetic fields weaken each other, or cancel out with each other, and when a current flows from the ground to one of the signal line LN1, LN2, and a current flows from the other of the signal lines LN1, LN2 to the ground (these current being referred to as "differential current" hereinafter) as shown in FIG. 6B, the coils L1, L2 generate magnetic fields having such directions that these magnetic fields reinforce each other.

The differential signal delivered from the transceiver 15 to the signal lines LN1, LN2 have such signal levels that vary symmetrically with respect to a pre-set idle potential (center potential). The transceiver 15 is configured to keep the signal levels of the signal lines LN1, LN2 at the idle potential while no differential signal is transmitted.

Accordingly, the capacitors C1, C2 are charged to the idle potential as a reference potential while no differential signal is transmitted. If the potential of the signal lines LN1, LN2 is lower than the idle potential, a current flows in a direction to charge the capacitors C1, C2, and if the potential of the signal lines LN1, LN2 is higher than the idle potential, a current flows in a direction to discharge the capacitors C1, C2.

In the termination circuit 25 having the above described structure, in case the common current flows, the common mode choke coil 27 exhibits low impedance. In this case, the termination circuit 25 has a circuit structure equivalently the same as that of the conventional RC termination circuit. On the other hand, in case the differential current flows, the common mode choke coil 27 exhibits high impedance. In this case, the termination circuit 25 is equivalently disconnected from the transmission line 3.

The common current (common mode noise) includes one that is caused by the operation of the transceiver 15, and one that is caused by immunity noise being propagated along the transmission line 3. The termination circuit 25 operates in the same way for both of them.

As explained above, in the vehicle-mounted communication system 1, the termination circuit 25 included in the vehicle-mounted control apparatus 10 is equivalently disconnected from a differential signal transmitted or received by the transceiver 15. This makes it possible to prevent the waveforms of the differential signal from becoming dull, and to prevent the signal level of the differential signal from lowering. In addition, since the termination circuit 25 operates equivalently in the same way as the conventional RC termination circuit for common mode noise which is a main cause of emission noise or immunity noise, common mode noise can be removed.

Accordingly, according to the vehicle-mounted communication system 1, it becomes possible to improve the transmission speed of differential signals and to ensure good waveforms of the differential signals without sacrificing the antinoise effect of the termination circuit 25, that is, without increasing the resistance of the resistive elements R1, R2. It also becomes possible to adopt the multi-termination concept in which all the vehicle-mounted control apparatus 10 are provided with the termination circuit 25.

Furthermore, since good waveforms of the differential signals can be ensured, it is possible to ease the restriction on the length and layout of the transmission line 3, to thereby improve the design freedom of the network.

Figure 7:
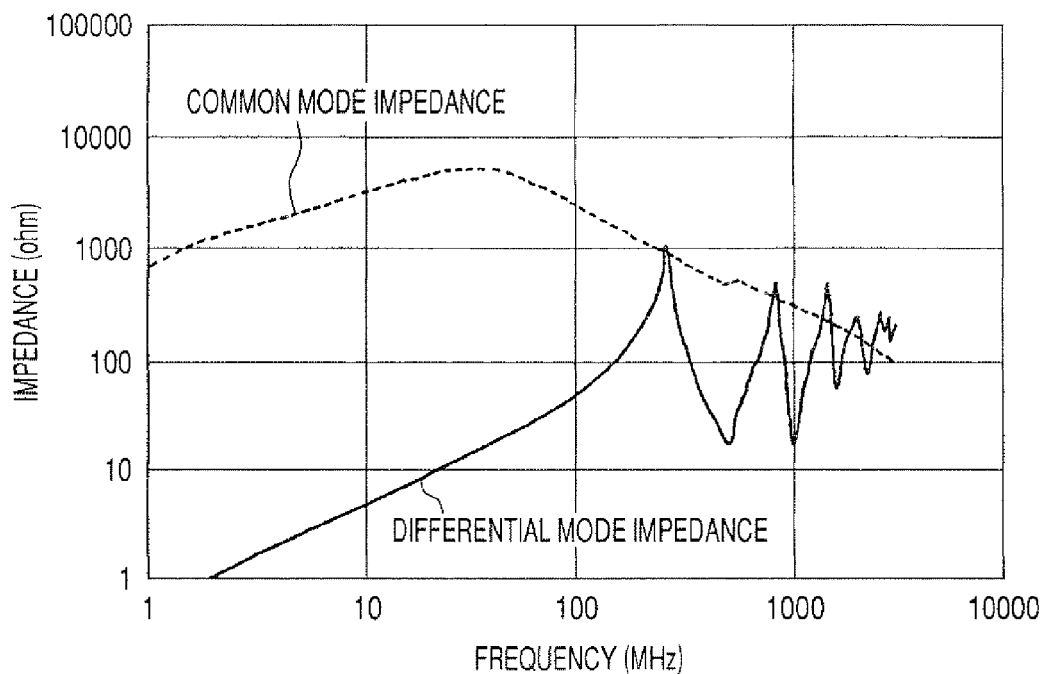
FIG. 7 is a graph showing a characteristic of the common mode choke coil.

FIG. 7 is a graph showing a characteristic of the common mode choke coil 27, which may be a TDK Corporation make ZJYS90V-101-2PTL. As shown in this graph, in case the frequency of a differential signal is 10 MHz, the common mode choke coil 27 exhibits an impedance of several kΩ when the differential current flows, and exhibits an impedance of several Ω when the common current flows. Assuming that the impedance of the transmission line 3 is adjusted to 100Ω by the termination circuits 5 connected to the ends of the transmission line 3, the impedance of the transmission line 3 and the impedance of the termination circuit 25 when the differential current is flowing are different from each other by more than an order of magnitude.

Accordingly, connecting the termination circuit 25 to the transmission line 3 does not much lower the impedance of the transmission line 3. For example, when the impedance of the common mode choke coil 27 is 5 kΩ, and the impedance of the resistive elements R1, R2 is 750Ω, the impedance of the transmission line 3 connected with the termination circuit 25 is about 98.3Ω. That is, the reduction of the impedance of the transmission line 3 is only 1.7%, which is as small as manufacturing error.

Figure 8:
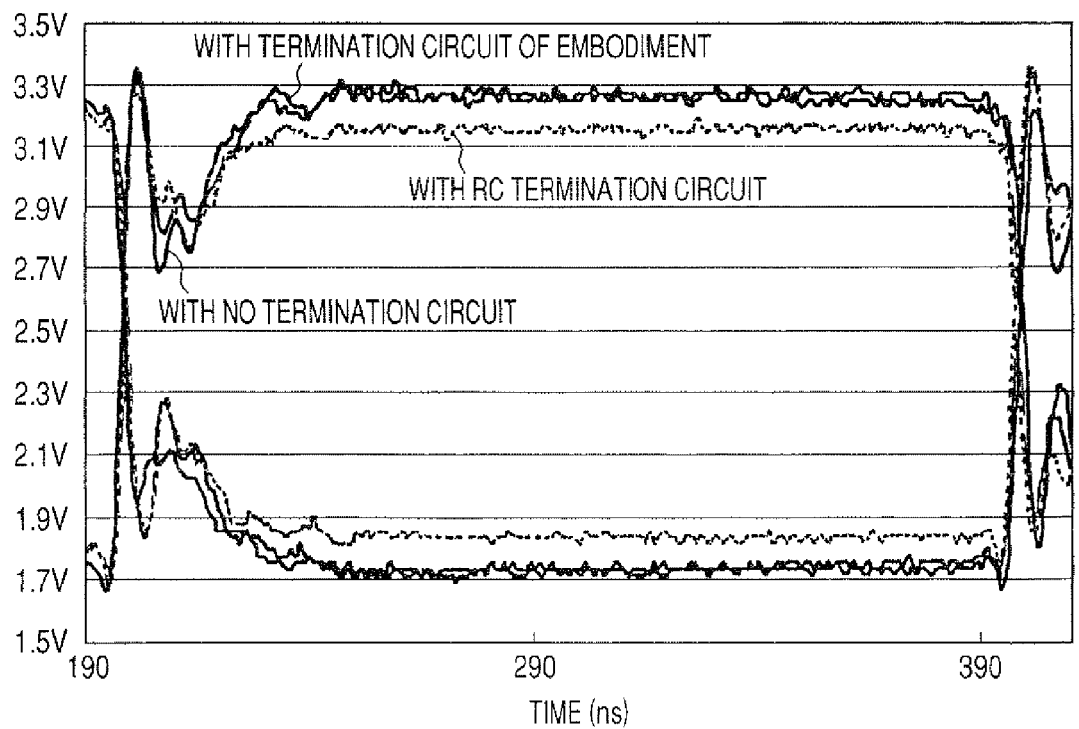
FIG. 8 is a graph showing effect of the termination circuit on amplitudes of differential signals on a transmission line.

FIG. 8 is a graph showing measurements of the signal levels of differential signals on the transmission line 3. This graph shows three different cases, a case where neither of the conventional RC termination circuits and the termination circuits 25 of this embodiment were provided, a case where the conventional RC termination circuits were provided, and a case where the termination circuits 25 of this embodiment were provided. Each termination circuit 25 included the resistive elements R1, R2 having an impedance of 750Ω and capacitors C1, C2 having a capacitance of 4700 pF. Each RC termination circuit included a resistive element and a capacitor respectively having the same resistance and the same capacitance as those of the termination circuit 25.

Figures 9A, 9B:
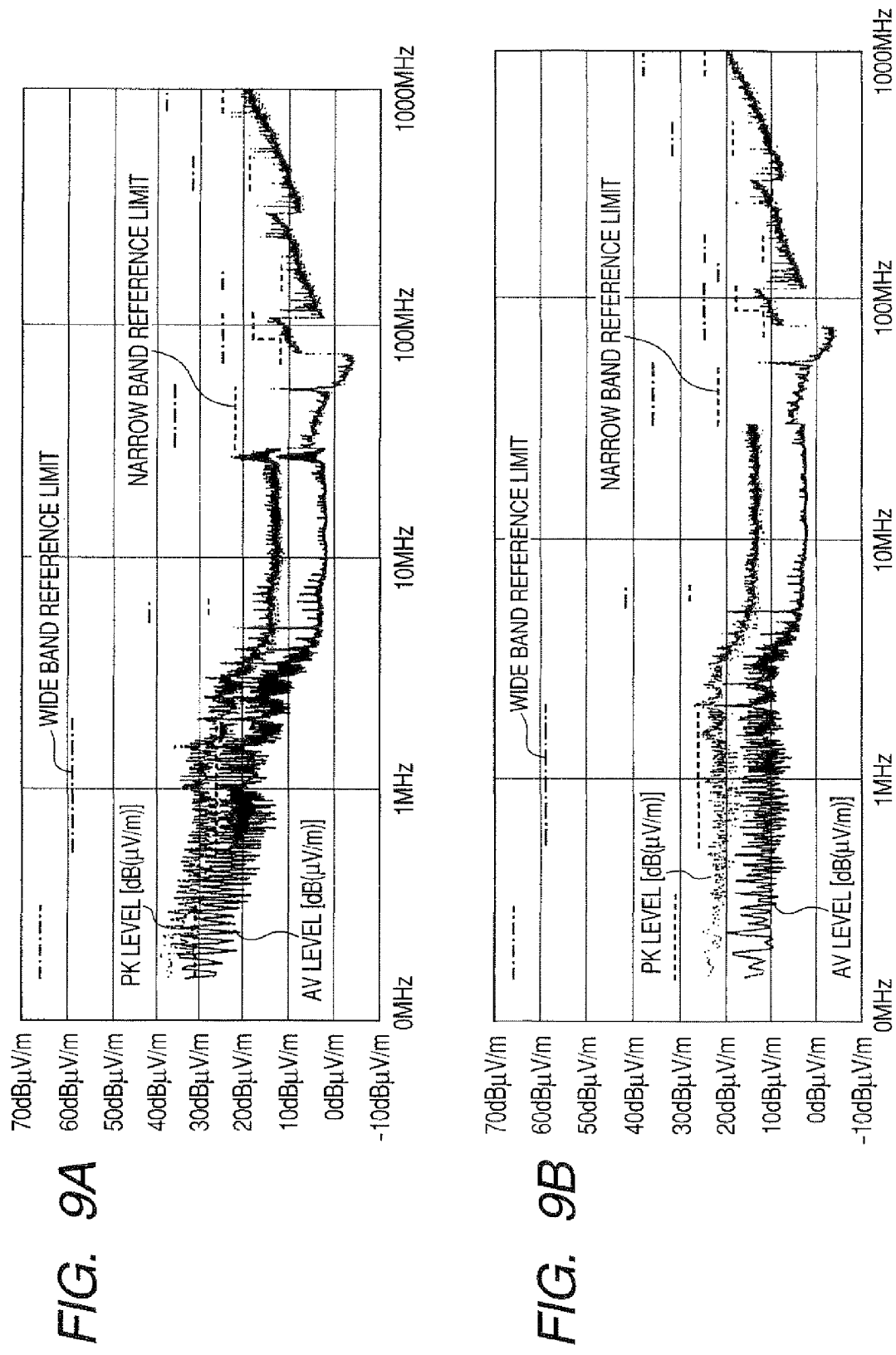
FIGS. 9A and 9B are graphs showing emission noise reduction effect of the termination circuit.

As seen from this graph, the signal levels of the differential signals are roughly the same between the case where the termination circuits 25 of this embodiment are provided and the case where the conventional RC termination circuits are provided, FIG. 9A is a graph showing measurements of emission noise in a case where the termination circuits 25 were not provided, and FIG. 9B is a graph showing measurements of emission noise in a case where the termination circuits 25 were provided.

The resistance of the resistive elements R1, R2 and the capacitance of the capacitors C1, C2 in this measurement are the same as those in the measurement of the signal levels (FIG. 8). In this graph, the term "PK level" means a noise peak level, and the term "AV level" means an average noise level.

As seen from this graph, according to the vehicle-mounted communication system 1 of this embodiment, it is possible to reduce emission noise up to 20 dBμV/m in a frequency range below 8 MHz, and to make the AV level lower than the narrow-band reference limit over the whole frequency range below 1 GHz to satisfy CLASS 4 of the CISPR25 standard.

OTHER EMBODIMENTS

It is a matter of course that various modifications can be made to the above described embodiment as set forth below.

Figure 10:
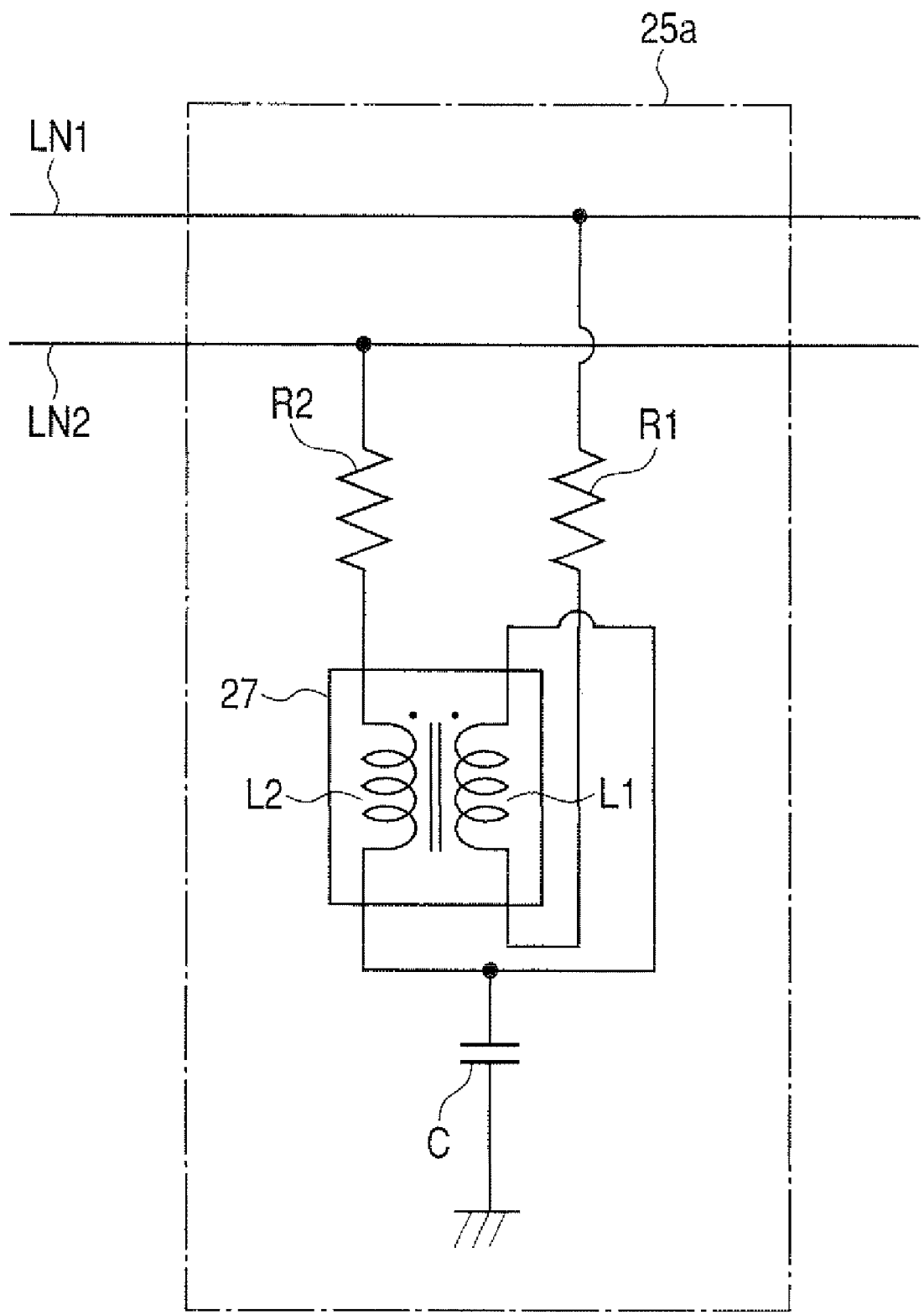
FIG. 10 is a diagram of a variant of the termination circuit.

In the above described embodiment, the termination circuit 25 that has two series circuits of the resistor element Ri and the capacitor Ci is configured to produce reference voltages to be applied to these series circuits for each of them separately by the two capacitors C1, C2. However, the termination circuit 25 may be replaced by a termination circuit 25a shown in FIG. 10 that has a structure in which the two series circuits are applied with a common reference voltage produced by a single capacitor C.

Figure 11:
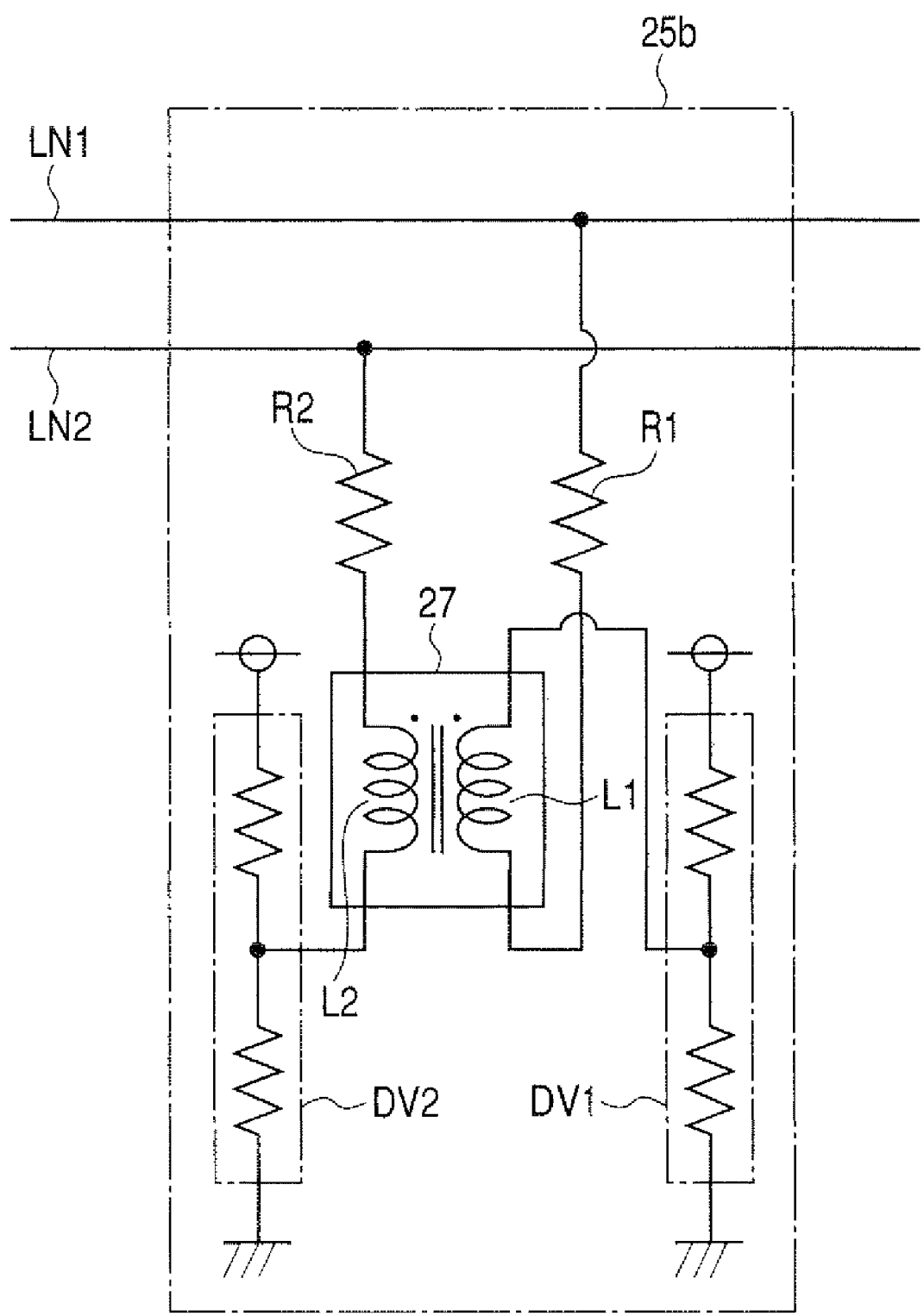
FIG. 11 is a diagram of a variant of the termination circuit.

The termination circuit 25 may be also replaced by a termination circuit 25b shown in FIG. 11 that has a structure in which, instead of the capacitors C1, C2, two voltage dividing circuits DV1, DV2 are used, each of which is constituted by two resistors connected in series to divide the power supply voltage, to thereby produce the reference voltage.

Figure 12:
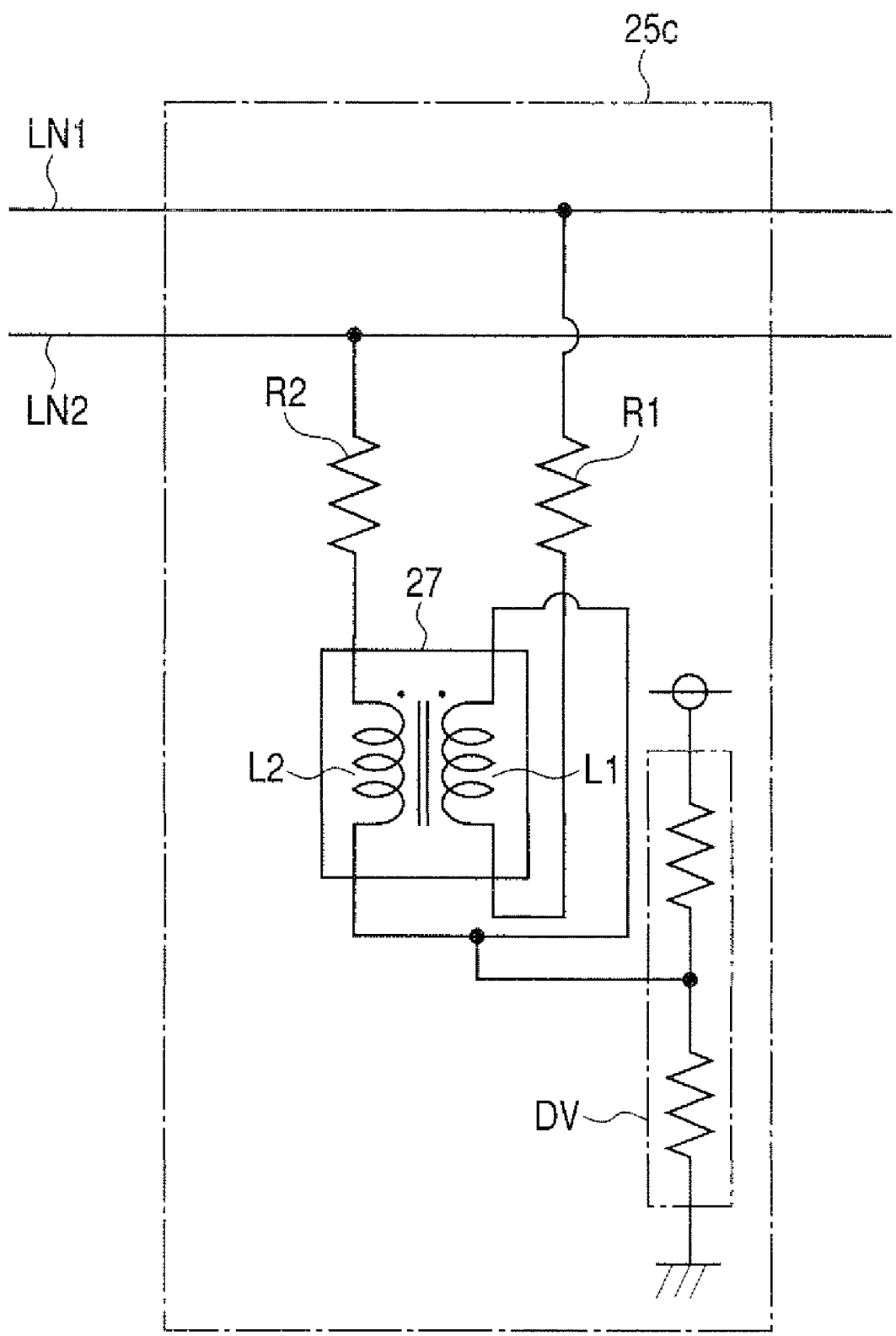
FIG. 12 is a diagram of a variant of the termination circuit.

The termination circuit 25 may also be replaced by a termination circuit 25c shown in FIG. 12 that has a structure in which, instead of the capacitors C1, C2, there is used a voltage dividing circuit DV constituted by two resistors connected in series to divide the power supply voltage, to thereby produce the common reference voltage.

Figure 13:
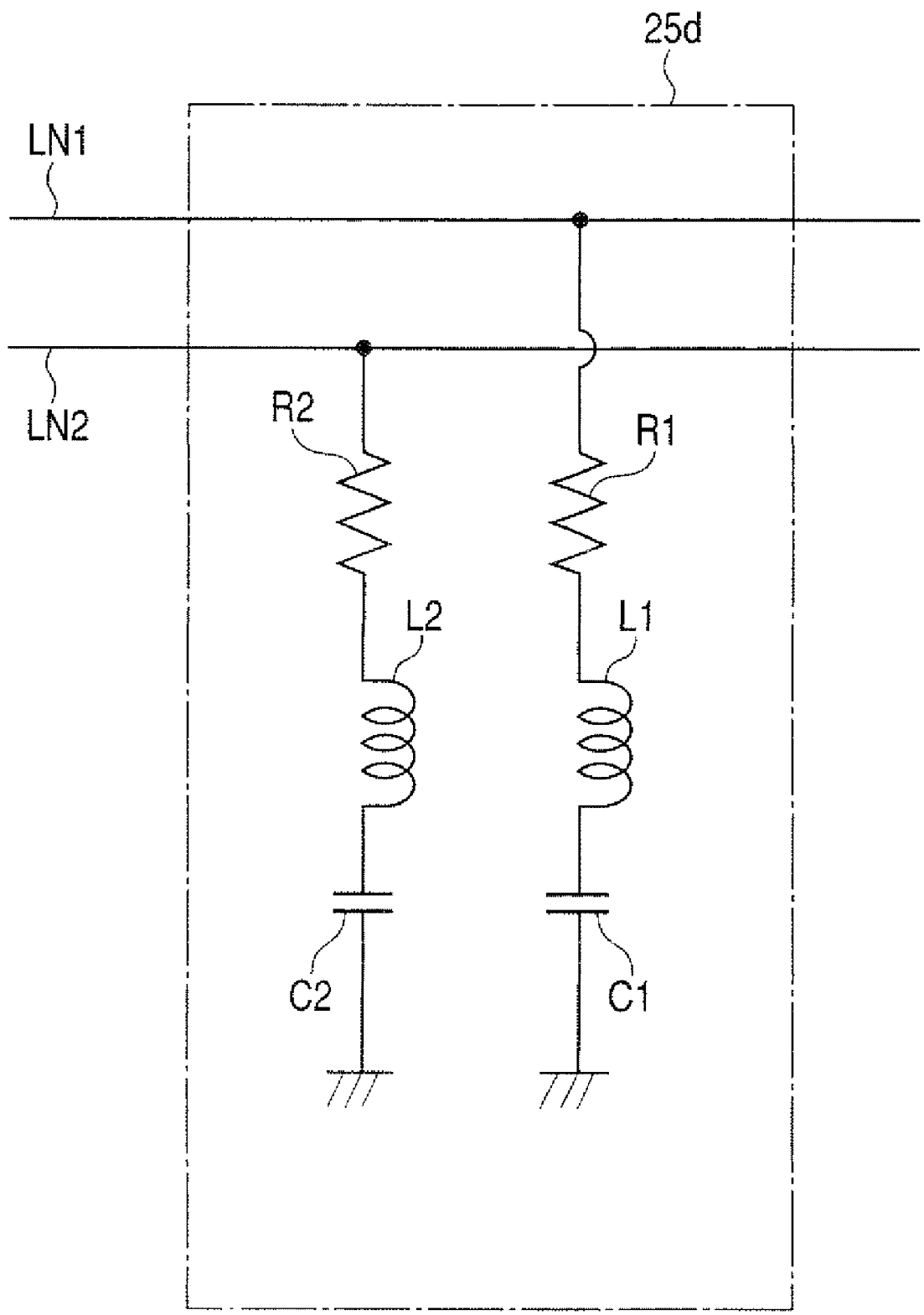
FIG. 13 is a diagram of a variant of the termination circuit.

In the above described embodiment, the common mode choke coil 27 of the termination circuit 25 is constituted of the two coils L1, L2 magnetically coupled to each other. However, the termination circuit 25 may be replaced by a termination circuit 25d shown in FIG. 13 having a structure in which the common mode choke coil 27 is constituted of the two coils L1, L2 magnetically separated from each other.

In this case, the effect of removing common mode noise is lowered, because the impedance of the coils L1, L2 when the common current flows is not reduced, however, the termination circuit can be made compact in size.

Figure 14:
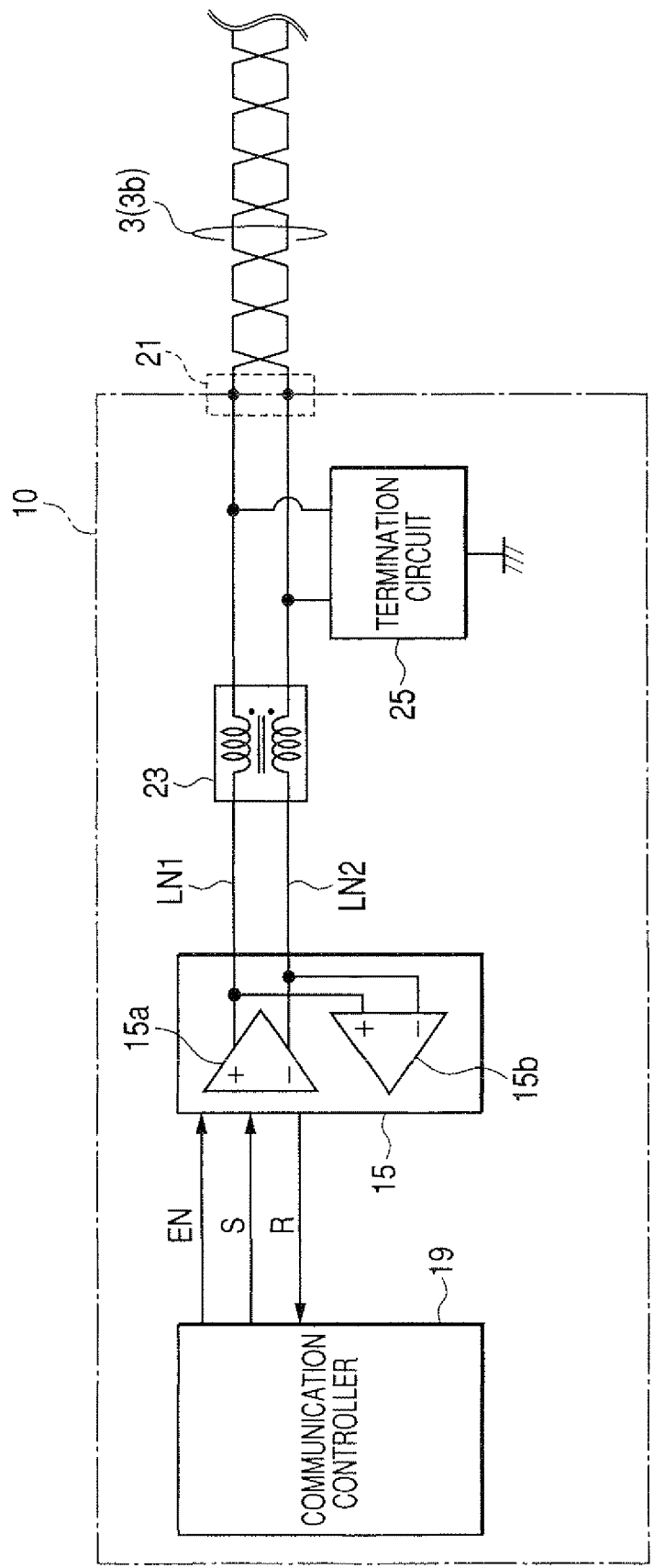
FIG. 14 is a connection diagram of the vehicle-mounted control apparatus around the transceiver and termination circuit, in which a locating position of the termination circuit is changed.
Figure 15:
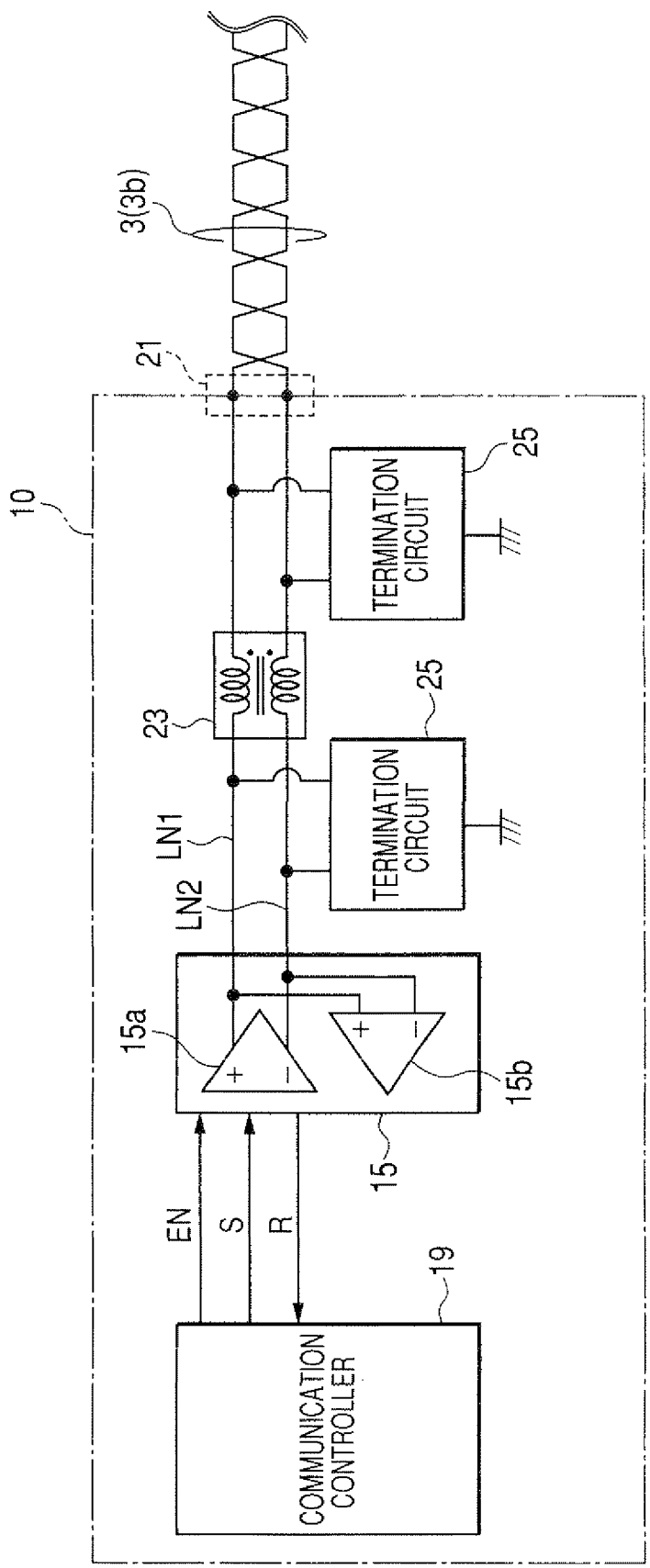
FIG. 15 is a connection diagram of the vehicle-mounted control apparatus around the transceiver and termination circuit, in which a locating position of the termination circuit is changed.

In the above described embodiment, although the termination circuit 25 is connected between the noise-suppressing component 23 and the transceiver 15, it may be located between the noise-suppressing component 23 and the input/output terminal 21 as shown in FIG. 14. Or as shown in FIG. 15, the termination circuit 25 may be connected between the noise-suppressing component 23 and the transceiver 15, and also between the noise-suppressing component 23 and the input/output terminal 21.

Figure 16:
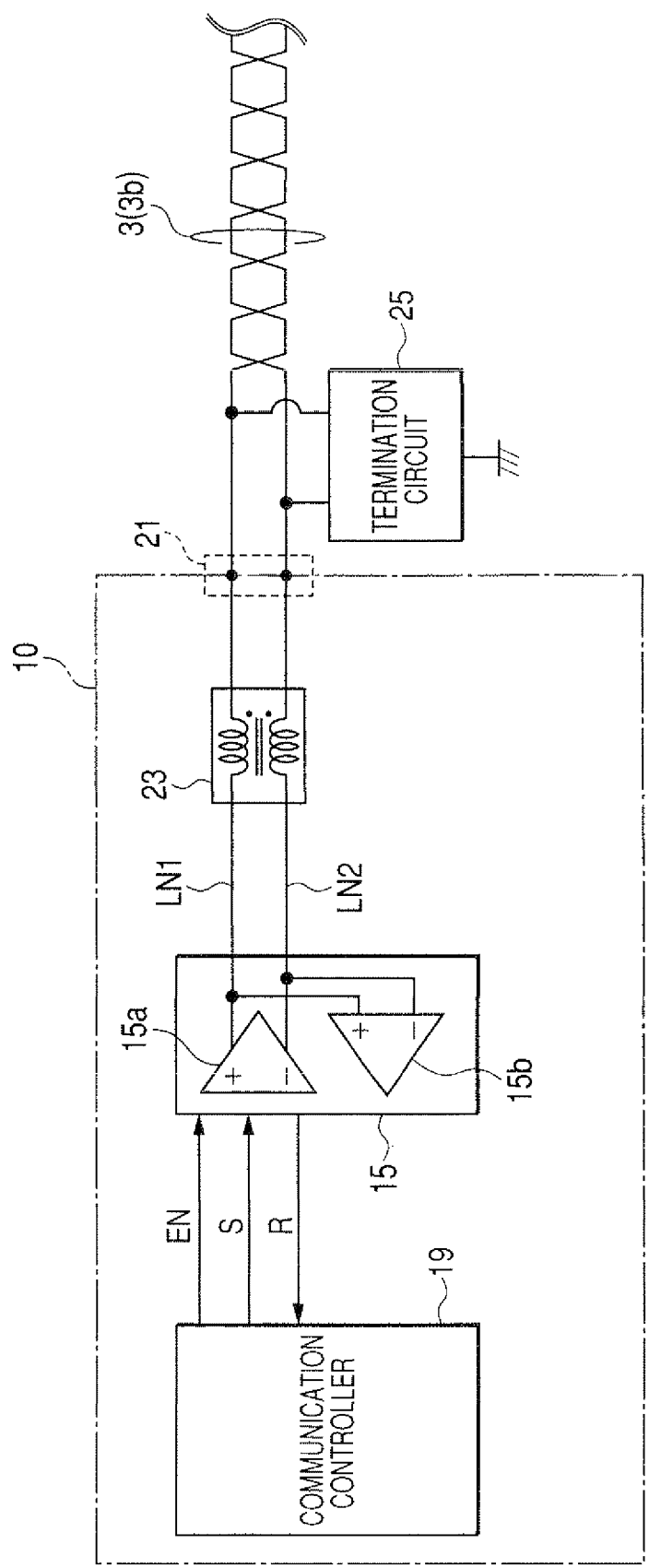
FIG. 16 is a connection diagram of the vehicle-mounted control apparatus around the transceiver and termination circuit, in which a locating position of the termination circuit is changed.
Figure 18A:
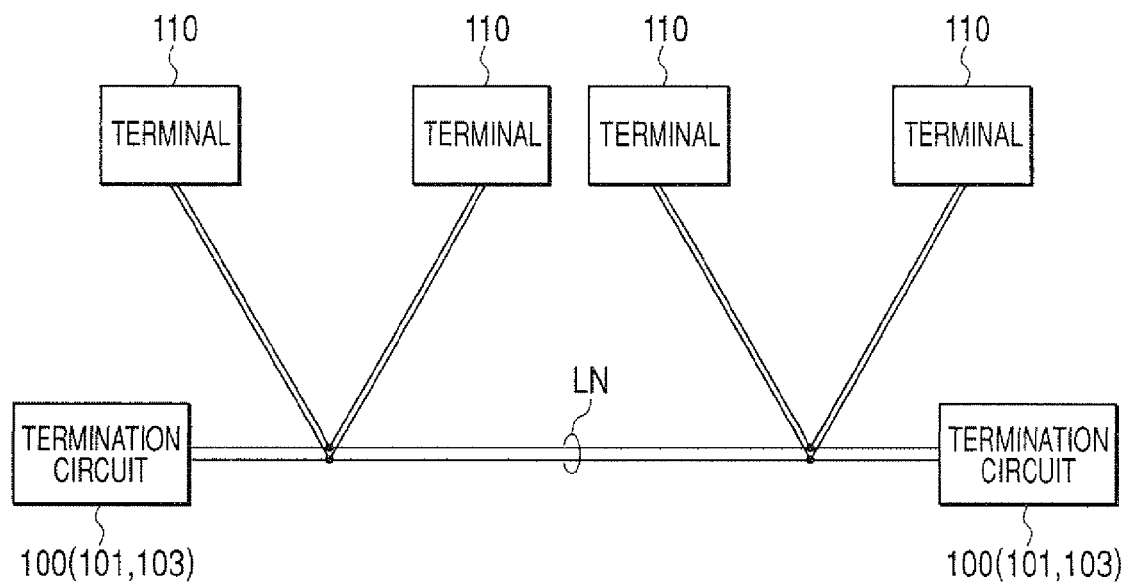
FIGS. 18A and 18B are diagrams schematically showing overall structures of conventional vehicle-mounted communication systems.
Figure 18B:
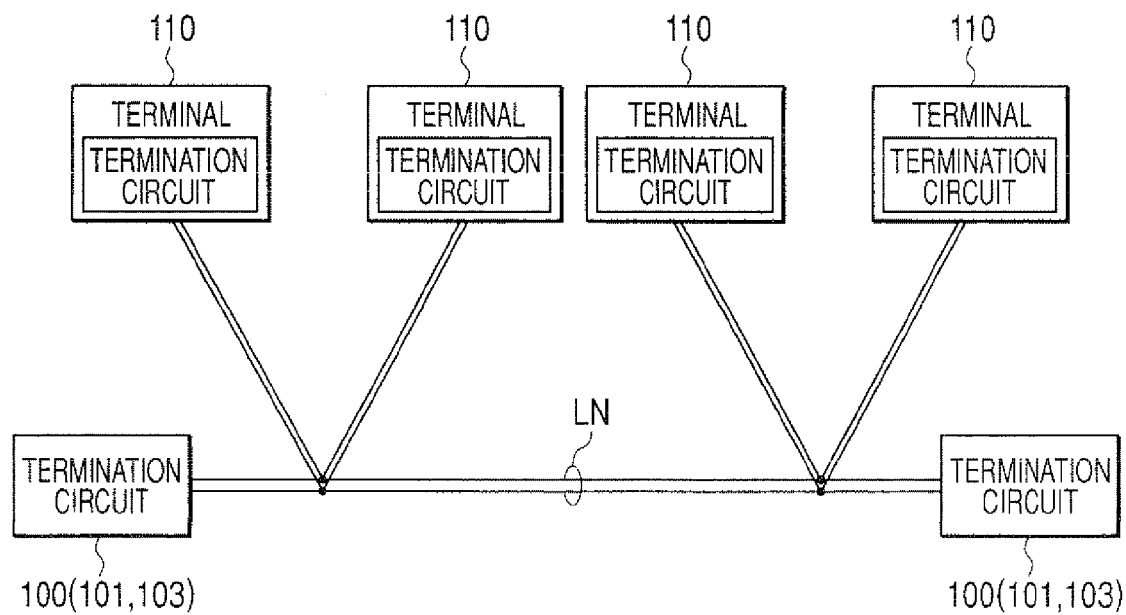

In the above described embodiment, although the termination circuit 25 is included in the vehicle-mounted control apparatus 10, it may be provided on the side of the transmission line 3, preferably between the input/output terminal 21 and the branch line 3b as shown in FIG. 16.

In the above described embodiment, although a split termination circuit is used as the termination circuit 5 to be connected to both ends of the trunk line 3a of the transmission line 3, the termination circuit 25 may be used instead of the split termination circuit.

In the above described embodiment, although the both ends of the trunk line 3a of the transmission line 3 are connected with the termination circuit 5, they may be connected with the vehicle-mounted control apparatus 10 including the termination circuit 25 to form a vehicle-mounted communication system 1a as shown in FIG. 17. It should be noted that the termination circuit 25 can be applied to not only a transmission line having a bus-like configuration, but also to a transmission line having a star-like configuration.

The above explained preferred embodiments are exemplary of the invention of the present application which is described solely by the claims appended below. It should be understood that modifications of the preferred embodiments may be made as would occur to one of skill in the art.

What is claimed is:

1. A termination circuit for use in a transmission line constituted by a first signal wire and a second signal wire to transmit a differential signal comprising:

a first series circuit of a first resistive element and a first inductive element, one end of said first resistive element being connected to said first signal wire, the other end of said first resistive element being connected to one end of said first inductive element, the other end of said first inductive element being applied with a reference voltage;

a second series circuit of a second resistive element and a second inductive element, one end of said second resistive element being connected to said second signal wire, the other end of said second resistive element being connected to one end of said second inductive element, the other end of said second inductive element being applied with said reference voltage; and a reference potential generating circuit generating, as said reference voltage, a potential equivalent to a center potential of said differential signal, wherein said reference potential generating circuit includes a voltage dividing circuit for dividing a power supply voltage to generate said reference voltage;

said first and second inductive elements being magnetically coupled such that said first and second inductive elements generate magnetic fields having such directions as to reinforce each other when a common-mode signal flows along said transmission line, and generate magnetic fields having such directions as to weaken each other when a differential-mode signal flows along said transmission line.

2. The termination circuit according to claim 1, wherein a common mode choke coil is used as a combination of said first and second inductive elements.

3. The termination circuit according to claim 1, wherein said reference potential generating circuit includes a capacitor element connected to said other ends of said first and second inductive elements at one end thereof, and grounded at the other end thereof.

4. A termination circuit for use in a transmission line constituted by a first signal wire and a second signal wire to transmit a differential signal comprising:

a first series circuit of a first resistive element and a first inductive element, one end of said first resistive element being connected to said first signal wire, the other end of said first resistive element being connected to one end of said first inductive element, the other end of said first inductive element being applied with a reference voltage;

a second series circuit of a second resistive element and a second inductive element, one end of said second resistive element being connected to said second signal wire, the other end of said second resistive element being connected to one end of said second inductive element, the other end of said second inductive element being applied with said reference voltage; and a reference potential generating circuit generating, as said reference voltage, a potential equivalent to a center potential of said differential signal;

wherein said reference potential generating circuit includes a voltage dividing circuit for dividing a power supply voltage to generate said reference voltage.

5. The termination circuit according to claim 4, wherein said reference potential generating circuit includes a capacitor element connected to said other ends of said first and second inductive elements at one end thereof, and grounded at the other end thereof.

6. A vehicle-mounted control apparatus comprising:

a transmit/receive circuit having a capability of exchanging a differential signal with another vehicle-mounted control apparatus through a transmission line constituted by a first signal wire and a second signal wire; and a termination circuit connected to said transmission line; said termination circuit including:

a first series circuit of a first resistive element and a first inductive element, one end of said first resistive element being connected to said first signal wire, the other end of said first resistive element being connected to one end of said first inductive element, the other end of said first inductive element being applied with a reference voltage;

a second series circuit of a second resistive element and a second inductive element, one end of said second resistive element being connected to said second signal wire, the other end of said second resistive element being connected to one end of said second inductive element, the other end of said second inductive element being applied with said reference voltage; and a reference potential generating circuit generating, as said reference voltage, a potential equivalent to a center potential of said differential signal, wherein said reference potential generating circuit includes a voltage dividing circuit for dividing a power supply voltage to generate said reference voltage;

said first and second inductive elements being magnetically coupled such that said first and second inductive elements generate magnetic fields having such directions as to reinforce each other when a common-mode signal flows along said transmission line, and generate magnetic fields having such directions as to weaken each other when a differential-mode signal flows along said transmission line.

7. The vehicle-mounted control apparatus according to claim 6, further comprising an input/output terminal to which said transmission line is connected, and a noise suppressing component connected between said input/output terminal and said transmit/receive circuit for suppressing common mode noise, said termination circuit being connected at least one of between said transmit/receive circuit and said noise suppressing component and between said noise suppressing component and said input/output terminal.

8. A vehicle-mounted control apparatus comprising:

a transmit/receive circuit having a capability of exchanging a differential signal with another vehicle-mounted control apparatus through a transmission line constituted by a first signal wire and a second signal wire; and a termination circuit connected to said transmission line; said termination circuit including:

a first series circuit of a first resistive element and a first inductive element, one end of said first resistive element being connected to said first signal wire, the other end of said first resistive element being connected to one end of said first inductive element, the other end of said first inductive element being applied with a reference voltage;

a second series circuit of a second resistive element and a second inductive element, one end of said second resistive element being connected to said second signal wire, the other end of said second resistive element being connected to one end of said second inductive element, the other end of said second inductive element being applied with said reference voltage; and a reference potential generating circuit generating, as said reference voltage, a potential equivalent to a center potential of said differential signal;

wherein said reference potential generating circuit includes a voltage dividing circuit for dividing a power supply voltage to generate said reference voltage.

9. The vehicle-mounted control apparatus according to claim 8, further comprising an input/output terminal to which said transmission line is connected, and a noise suppressing component connected between said input/output terminal and said transmit/receive circuit for suppressing common mode noise, said termination circuit being connected at least one of between said transmit/receive circuit and said noise suppressing component and between said noise suppressing component and said input/output terminal.

10. A vehicle-mounted communication system comprising:

a transmission line constituted by a first signal wire and a second signal wire;

a plurality of vehicle-mounted control apparatuses, each one of which includes a transmit/receive circuit having a capability of exchanging a differential signal with other said vehicle-mounted control apparatuses through said transmission line; and
a termination circuit connected to said transmission line;
said termination circuit including:
a first series circuit of a first resistive element and a first inductive element, one end of said first resistive element being connected to said first signal wire, the other end of said first resistive element being connected to one end of said first inductive element, the other end of said first inductive element being applied with a reference voltage;
a second series circuit of a second resistive element and a second inductive element, one end of said second resistive element being connected to said second signal wire, the other end of said second resistive element being connected to one end of said second inductive element, the other end of said second inductive element being applied with said reference voltage; and
a reference potential generating circuit generating, as said reference voltage, a potential equivalent to a center potential of said differential signal, wherein said reference potential generating circuit includes a voltage dividing circuit for dividing a power supply voltage to generate said reference voltage;
said first and second inductive elements being magnetically coupled such that said first and second inductive elements generate magnetic fields having such directions as to reinforce each other when a common-mode signal flows along said transmission line, and generate magnetic fields having such directions as to weaken each other when a differential-mode signal flows along said transmission line.

11. The vehicle-mounted communication system according to claim 10, wherein said termination circuit is included in at least one of said vehicle-mounted control apparatuses.

12. The vehicle-mounted communication system according to claim 10, wherein said termination circuit is located outside said vehicle-mounted control apparatuses.

13. The vehicle-mounted communication system according to claim 12, wherein said vehicle-mounted control apparatuses includes an input/output terminal connected to said transmission line, and said termination circuit is located near said connection terminal of at least one of vehicle-mounted control apparatuses.

14. A vehicle-mounted communication system comprising:
a transmission line constituted by a first signal wire and a second signal wire;
a plurality of vehicle-mounted control apparatuses, each one of which includes a transmit/receive circuit having a capability of exchanging a differential signal with other said vehicle-mounted control apparatuses through said transmission line; and
a termination circuit connected to said transmission line;
said termination circuit including:
a first series circuit of a first resistive element and a first inductive element, one end of said first resistive element being connected to said first signal wire, the other end of said first resistive element being connected to one end of said first inductive element, the other end of said first inductive element being applied with a reference voltage;
a second series circuit of a second resistive element and a second inductive element, one end of said second resistive element being connected to said second signal wire, the other end of said second resistive element being connected to one end of said second inductive element, the other end of said second inductive element being applied with said reference voltage; and
a reference potential generating circuit generating, as said reference voltage, a potential equivalent to a center potential of said differential signal;
wherein said reference potential generating circuit includes a voltage dividing circuit for dividing a power supply voltage to generate said reference voltage.

15. The vehicle-mounted communication system according to claim 14, wherein said termination circuit is included in at least one of said vehicle-mounted control apparatuses.

16. The vehicle-mounted communication system according to claim 14, wherein said termination circuit is located outside said vehicle-mounted control apparatuses.

17. The vehicle-mounted communication system according to claim 16, wherein said vehicle-mounted control apparatuses includes an input/output terminal connected to said transmission line, and said termination circuit is located near said connection terminal of at least one of vehicle-mounted control apparatuses.

* * * * *